(12) United States Patent
Urban

(10) Patent No.: US 8,645,212 B2
(45) Date of Patent: Feb. 4, 2014

(54) DETECTION OF EXIT BEHAVIOR OF AN INTERNET USER

(71) Applicant: Bounce Exchange LLC, New York, NY (US)

(72) Inventor: Ryan Joshua Urban, New York, NY (US)

(73) Assignee: Bounce Exchange LLC, New York, NY (US)

( * ) Notice: Subject to any disclaimer, the term of this patent is extended or adjusted under 35 U.S.C. 154(b) by 0 days.

(21) Appl. No.: 13/660,519

(22) Filed: Oct. 25, 2012

(65) Prior Publication Data

US 2013/0290117 A1 Oct. 31, 2013

Related U.S. Application Data

(60) Provisional application No. 61/640,714, filed on Apr. 30, 2012.

(51) Int. Cl.
*G06Q 30/00* (2012.01)
*G06Q 30/02* (2012.01)

(52) U.S. Cl.
CPC ........ *G06Q 30/0277* (2013.01); *G06Q 30/0241* (2013.01)
USPC ...................................... 705/14.73; 705/14.4

(58) Field of Classification Search
USPC ...................................................... 705/14.73
See application file for complete search history.

(56) References Cited

U.S. PATENT DOCUMENTS

| 5,191,641 | A | 3/1993 | Yamamoto | |
|---|---|---|---|---|
| 6,204,845 | B1 * | 3/2001 | Bates et al. | 715/788 |
| 6,636,247 | B1 * | 10/2003 | Hamzy et al. | 715/808 |
| 8,160,925 | B2 | 4/2012 | Anand | |
| 8,165,915 | B1 | 4/2012 | Lucash | |
| 8,224,693 | B2 | 7/2012 | Lukose | |
| 2005/0216866 | A1 * | 9/2005 | Rosen et al. | 715/856 |
| 2006/0164386 | A1 * | 7/2006 | Smith et al. | 345/156 |

OTHER PUBLICATIONS

Mitchell, "Prompting a User to Save When Leaving a Page", 4 Guys From Rolla.com, Oct. 6, 2004, found on line at www.4guysfromrolla.com/webtech/100604-1.shtml.*

"Grey out a webpage", the electric toolbox, Jun. 26, 2009, found on line at electrictoolbox.com/grey-out-webpage.*

Smith, "User Engagement the Only Metric that Matters", SEO Design Solutions, Feb. 21, 2008, found on line at www.seodesignsolutions.com/blog/internet-marketing/user-engagement-the-only-metric-that-matters/.*

Mitchell, "Promoting a User to Save When Leaving a Page," 4 Guys From Rolla.com, Oct. 6, 2004, found online at www.4guysfrorolla.com/webtech/100604-1.shtml.

Smith, "User Engagement the Only Metric that Matter", SEO Design Solutions, Feb. 21, 2008, found online at www.seodesignsolutions.com/blog/internet-marketing/user-engagement-the-only-metric-that-matters/.

* cited by examiner

*Primary Examiner* — John G Weiss
*Assistant Examiner* — Scott C Anderson
(74) *Attorney, Agent, or Firm* — Pepper Hamilton LLP

(57) ABSTRACT

User action in the form of movement of a tracking device on a webpage, represented by cursor gestures on the webpage, is used to detect if a user intends to leave the webpage. Upon detection of an intent to leave the webpage, an advertisement may be displayed to a user. The advertisement may be targeted to the user and/or based on the content the user was viewing on the webpage.

28 Claims, 7 Drawing Sheets

300

310
Detecting User

↓

320
Tracking User-
Controlled Movement

↓

330
Detecting User Device
Characteristics

↓

340
Identify an Action of
Leaving the Webpage

FIG. 3

DETECTION OF EXIT BEHAVIOR OF AN INTERNET USER

TECHNICAL FIELD

The present disclosure relates to detecting exit behavior of a user on a webpage. The present disclosure further relates to detecting exit behavior by tracking cursor movement or gestures on a webpage.

BACKGROUND

Online advertising is used on a wide range of websites to provide revenue to the website host. For example, advertisers may pay the host to populate portions of the website with advertisements. The advertisements may be provided in the margins alongside the main content of the website, as pop-up windows, or as full-page ads before the content of the website is provided, for example. The advertisements are often targeted to a user accessing the website. In many cases, the user considers the advertisements to be cumbersome or bothersome when the user is attempting to read the content on the website. Often, the user may simply ignore the advertisements. The present disclosure relates to a method of detecting exit behavior of a user accessing the webpage. By detecting exit behavior, more purposeful internet content can be delivered to an internet user because the visitor's session is effectively over, therefore his visit is not interrupted by the content. In some embodiments, the internet content comprises an advertisement unit comprising one or a plurality of advertisements.

SUMMARY

This specification describes methods, apparatus and computer program products related to the presentation of content in an electronic media contingent upon the exit behavior displayed by a user of a website.

The disclosure relates to a method of detecting exit behavior of a user on a webpage who operates a user device that accesses the internet. The user device comprises a tracking device through which the user of the user device may control movement, position, speed and location of a cursor visible screen or monitor of the user device. In some embodiments, the disclosure relates to a method of detecting exit behavior of a user on a webpage, wherein the user accesses the internet through a user device. In some embodiments, the method comprises: (a) detecting a user of a user device that accesses a webpage; and (b) tracking cursor movement controlled by the user on the webpage. In some embodiments, the disclosure relates to a method comprising detecting a cursor gesture associated with exit behavior. In some embodiments, any of the disclosed methods herein comprise the step of detecting a cursor gesture associated with exit behavior.

In some embodiments, the disclosure relates to a method of providing advertisements to a user of a user device that accesses the internet. In some embodiments, the method includes detecting a user accessing a webpage; collecting data associated with the user; and detecting exit behavior. In some embodiments, if exit behavior is detected, an advertisement unit on the webpage is displayed. The advertisement unit contains one or more advertisements at least partially based upon the data associated with the user.

The disclosure further relates to a computer program product encoded on a computer-readable storage medium that comprises instructions for performing any of the methods described herein. In some embodiments, the disclosure relates to a method of providing advertisements to a user of a user device that accesses the internet. In some embodiments, the instructions are for detecting a user accessing a webpage and collecting data associated with the user. In some embodiments, the instructions further detect exit behavior. In some embodiments, the instructions cause the display of an advertisement unit on the webpage if exit behavior is detected. In some embodiments, the advertisement unit contains one or more advertisements at least partially based upon the data associated with the user. In some embodiments, the advertisement unit contains one or more advertisements at least partially based upon the data collected by the one or more methods disclosed herein. In some embodiments, the advertisement unit contains one or more advertisements at least partially based upon the data associated with the user or user device.

In some embodiments, the disclosure relates to a computer-implemented method of detecting exit behavior of a user of a user device that accesses the internet, the method comprising: detecting a user accessing a webpage; detecting exit behavior on the webpage, displaying an advertisement unit on the webpage, wherein the advertisement unit contains one or more advertisements and wherein the advertisement comprises a solicitation with the ultimate aim of converting a sale. In some embodiments, the disclosure relates to a computer-implemented method of detecting exit behavior of a user of a user device that accesses the internet, the method comprising: detecting a user accessing a webpage; detecting exit behavior on the webpage, displaying an advertisement unit on the webpage, wherein the advertisement unit contains one or more advertisements and wherein the advertisement comprises a solicitation for a conversion of a product or service or message associated with the webpage. In some embodiments, the disclosure relates to a computer-implemented method of detecting exit behavior of a user of a user device that accesses the internet, the method comprising: detecting a user accessing a webpage; detecting exit behavior on the webpage, displaying an advertisement unit on the webpage, wherein the advertisement unit contains one or more advertisements and wherein the advertisement comprises a solicitation for a conversion of a product or service or message associated with the webpage; wherein identifying a cursor gesture associated with exiting the webpage comprises one or a combination of: (i) identifying cursor acceleration at or below a predetermined value; (ii) breaking a plane of the webpage; and (iii) identifying cursor movement to a location of the webpage associated with leaving the webpage.

In some embodiments, the disclosure relates to a method of user display segmentation. In some embodiments, the disclosure relates to a computer-implemented method of display segmentation, the method comprising: detecting a user accessing a webpage; collecting data about the user; and segmenting the user display into coordinates that correspond to pixilation based upon the a user's data. In some embodiments, the method further comprising activating or deactivating detection function at a particular coordinate or set of coordinates.

BRIEF DESCRIPTION OF THE DRAWINGS

The foregoing and other aspects of the present disclosure are best understood from the following detailed description when read in connection with the accompanying drawings. For the purpose of illustrating the disclosure, it is understood that the illustrated embodiments are representative of the larger disclosure, however, the disclosure is not limited to the specific instrumentalities disclosed. Included in the drawings are the following Figures:

FIG. 3 is a flow chart of a method of detecting exit behavior on a webpage accessed by a user of a user device that accesses the internet.

DETAILED DESCRIPTION

Figure 1:
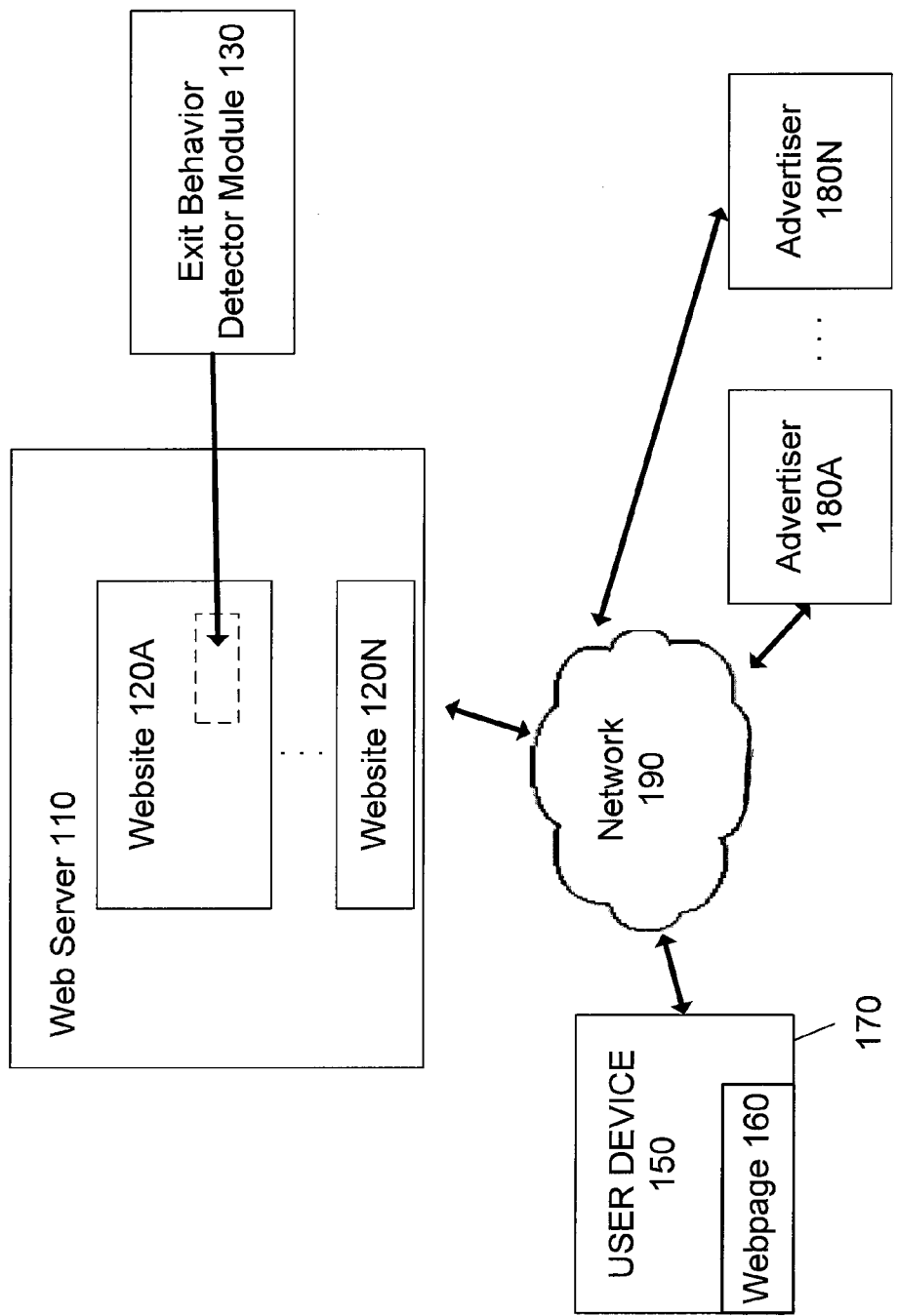
FIG. 1 is a block diagram of a system configured to detect exit behavior and provide advertisements to an internet user at a user device based on exit behavior detection.

As used herein an "advertisement" means any form of communication in which one or more products, services, ideas, messages, people, organizations or other items are identified and promoted. In some embodiments, an advertisement is not limited to commercial promotions or other communications. In some embodiments, an advertisement is a public service announcement or any other type of notice, such as a public notice published in printed or electronic press or a broadcast. In some embodiments, an advertisement is or includes sponsored content. In some embodiments, the advertisement or promotional information may promote the sale of a product or service. In some embodiments, the advertisement or promotional information may promote the sale of a product or service associated with the webpage out of which the user of the user device wishes to exit. In some embodiments, the advertisement is or comprises a solicitation for a conversion activity, including but not limited to requesting contacting information for future communication, driving users to a certain product page, prompting users to refer a friend, asking a visitor to engage with social media pages, showing limited time offers, and informing visitors of existing internal promotions/deals. In some embodiments, the advertisement is a graphical advertisement, such as a banner advertisement, text only advertisement, image advertisement, audio advertisement, video advertisement, or an advertisement combining one of more of any of such components, executable code, or any other media, content, or interactive advertisement and the like. In some embodiments, the advertisement includes embedded information, such as links, meta-information, and/or machine executable instructions. The advertisement also may have various intrinsic features. In some embodiments, such features are specified by an application and/or by an advertiser, often depending on the type of advertisement. For example, in the case of a text advertisement, advertisement features may include a title line, ad text, and an embedded link. In the case of an image advertisement, advertisement features may include images, executable code, and an embedded link. In some embodiments, the advertisement is an advertisement disclosed in U.S. Pat. Nos. 8,224, 693; 8,165,915; 8,160,925, which are herein incorporated by reference in their entireties.

As used herein an "advertisement unit" means a window, display, or content area that comprises one or a plurality of advertisements; or a window, display, or content area upon which an advertisement or plurality of advertisements is populated. In some embodiments, the advertisement unit comprises a solicitation (text or link) that provides or solicits a conversion action. In some embodiments, the advertisement unit comprises a solicitation (text or link) that requests information from the user that can be used for future communication of an advertisement or solicitation of a conversion activity.

In some embodiments, the advertisement unit includes one or a plurality of advertisements that are relevant to user interest. In some embodiments, the system or program product described herein retrieves and provides one or a plurality of relevant advertisements based on the information received from the user device. In some embodiments, the system or program product described herein retrieves and provides one or a plurality of relevant advertisements from a website out of which the user of a device intends to exit. In some embodiments, the system or program product described herein retrieves and provides one or a plurality of relevant advertisements from an advertisement repository associated with a product from a website out of which the user of a device intends to exit. In some embodiments, the system or program product described herein retrieves and provides one or a plurality of relevant advertisements from an advertisement repository associated with the website out of which the user of a device intends to exit. In some embodiments, the system or program product described herein retrieves advertisement information from an advertisement repository using the back-end processing systems. In some embodiments, the system or program product retrieves one or a plurality of relevant advertisements using information from a crawling module, various keywords, various statistical associations between advertisements and content, and/or preference information associated with the publishers, and/or preference information associated with the website. In some embodiments, the system or program product retrieves one or a plurality of relevant advertisements using data associated with the user.

In some embodiments, when a user clicks on or otherwise interacts with the displayed advertisement or advertisement unit, an embedded code snippet directs the user device to contact the system or program product described herein. During this event, the user device may receive an information parcel, such as a signed browser cookie, from the system or program product. In some embodiments, the information parcel includes information, such as an identifier of the selected advertisement, an identifier of the publisher, and/or the date and/or time the advertisement was selected by the user. In some embodiments, the information parcel facilitates processing of conversion activities or other user transactions. In some embodiments, the user device then becomes redirected to the advertiser owner associated with the selected advertisement. In some embodiments, the user device sends a request to the associated advertiser and then load a landing page from the advertiser. In some embodiments, the user performs a conversion action at the advertisement unit, such as purchasing a product or service, registering, joining an electronic mailing list, etc. In some embodiments, the system or program product described herein provides a code snippet, which may be included within a conversion confirmation page script such as a script within a web page presented after the purchase. In some embodiments, the user device executes the code snippet, which contacts the system or program product described herein and reports conversion data to the system or program product. In some embodiments, the system or program product comprises or includes conversion data, any of which includes conversion types and numbers and/or information from cookies. In some embodiments, the system or program product comprises described herein includes a conversion data repository that comprises and maintains the conversion data.

For purposes of this application, the terms "cursor gesture" means one or a plurality of a movements, directions, locations, speeds, or vectors of a cursor on a screen or monitor that is/are controlled by the user accessing a website on the internet through a user device. In some embodiments, the user controls cursor gesture through a tracking device. In some embodiments, the tracking device is selected from one or a plurality of: a touch screen, a tablet screen, a laptop key or button, a keyboard, a kinetic detection system that detects user movement and translates user movement into cursor movement on a corresponding screen, a track ball, a track pad; a mouse; a joystick, and voice activated cursor direction device or other similar device.

The terms "cursor gesture associated with exiting the website" mean a set of cursor gestures that relate to a user's intent to close or exit the webpage of the internet being viewed by the user. In some embodiments, the cursor gesture associated with exiting the website is one or a combination of cursor gestures selected from: cursor acceleration at or below a predetermined value; breaking a plane of the webpage; and cursor movement to a location of the webpage associated with function of leaving the webpage. In some embodiments, a location of the webpage associated with function of leaving the webpage is the address bar, search bar, a tab button of opening a new webpage, or the "back" button. For instance, through use of a typical web browser, a menu of options, buttons, or functions associated with the web browser functionality can be highlighted and selected at the top of a webpage. The web browser functionality is located on the screen at a position or positions independent of any addressable positions of the website being viewed. The position or positions of the screen that define an interface between the web browser functionality and the addressable positions of the website being viewed is the plane. For instance, in some embodiments, the computer program segments the browser window into a coordinate system with an "x" horizontal value and a "y" vertical value that corresponds to each pixel position on a screen. In some embodiments, the upper left corner represents the coordinate (0,0) (x=0 and y=0) and the bottom right represents the point (x,y) where the x value increasingly positive the farther right the pixel is from the reference point (0,0) and the y value is increasingly positive the farther down the pixel position is from the reference point (0,0). In some embodiments, a predetermined y value is set to correspond to the horizontal line of pixels that are positioned at the interface of where the webpage ends on the user's screen and where the web browser functionality begins. In some embodiments, the y value or interface value coordinate is (x, 2). One of ordinary skill in the art would understand based upon each user's user settings, operating system, browser, and resolution what the appropriate y value (or interface value) is that corresponds to the horizontal line of pixels that is interface between the web browser and the webpage. In some embodiments, the software can be set to create a dead zone whereby the software will not detect a portion or region of the web display defined by a set of at least one, two, three or four coordinates on the user's display.

Contemporaneously with the standard set interface value (such as (x, 2)) is set, the software detects the position of the cursor on the screen and monitors the (x, y) value. When the user moves the cursor upward on the screen, the software detects the segmented coordinates of the cursor position. If there is upward movement of the cursor, the y value of the coordinate system should be decreasing. Once the software detects the cursor position to be approaching the interface value of y, the software will trigger an advertisement. In some embodiments, the advertisement is triggered when the cursor has crossed the interface value. In some embodiments, the advertisement is displayed or triggered when the software detects the cursor position to have crossed the interface value in combination with one or more of the following detected characteristics: (i) a type of web browser being utilized by the user device; (ii) an operating system of the user or user device; (iii) whether Javascript® has been enabled or disabled on the user device; (iv) a network connection speed of the user device; (v) an enabled cookie; (vi) screen resolution settings of the user device; (vii) the presence and/or acceleration and/or direction of mouse gestures; (viii) user search criteria; (ix) user identification information; (x) user preferences; (xi) user location; (xii) browser information; (xiii) user device characteristics; and (xiv) user referral history. The terms "in combination with one or more" means that, in some embodiments, the software detects any combination of any individual or a plurality of (i) through (xiv) characteristics above with the detection of the cursor position across the interface value. In other words, in some embodiments the software may trigger an advertisement when software detects the cursor breaking the plane of the webpage in combination with one or more of the any of the characteristics described herein. In some embodiments, the software detects the breaking of the plane of the cursor in combination with the acceleration of the cursor on the segmented screen of the user. In some embodiments, the software detects the speed at which the (x,y) values are changing. In some embodiments the software detects the breaking of the plane in combination with the acceleration of the cursor toward the interface value.

It is understood that any interface value may be set for detection of cursor position across a particular horizontal pixel line on the user's display. While the software may have a default setting for the interface value to be 2, it is understood that a line lower than interface value may be set for detection purposes depending upon how frequently a website owner may want to trigger the display of the advertisement. For instance, in some embodiments, the software has a default setting of (x, 2) after detection of a user on a user device adapted for Internet Explorer on a PC with high resolution. If a webpage owner desires to have software trigger advertisements more frequently, the software can set the software to detect cursor position and acceleration across the (x, 20) horizontal line of pixels. In some embodiments, the software detects the cursor position vertical movement in combination with acceleration or deceleration through that plane defined by the y value that defines the horizontal line of pixels. In some embodiments, the user is breaking the plans of the website when the software detects the cursor movement across the interface value or any set horizontal line of pixels on the user display.

In some embodiments, the user's breaking the plane of the website either alone or in combination with one or a plurality of other cursor gestures indicates a willingness to leave or exit the webpage currently being viewed. In some embodiments, detection of exit behavior comprises detection of or identification of a cursor gesture associated with exiting the website, wherein the cursor gesture comprises breaking the plane accompanied by an acceleration of the cursor to a position on the screen associated with the exit or close of the web browser. In the case of the above illustrative embodiment, the exit or close function of the web browser is typically located (by default settings) at the top right of the screen and is indicated as an "x" button. In some embodiments, the method comprises detecting a cursor gesture of breaking the plane in combination with accelerated movement of the cursor from a position on the website to the top right of the screen or monitor being viewed by the user.

As used herein the terms "conversion" or "conversion activities" means an activity or activities in which a user of a device consummates a transaction or in which a user is invited to consummate a transaction related to an advertisement, advertisement unit, or data associated with the user. For example, in some embodiments, a conversion occurs when a user clicks on an advertisement, which refers them to the advertiser's web page, and consummates a purchase on the advertiser's web page before leaving that web page. In another example, a conversion is the display of an advertisement to a user who provides an email address into a repository. In some embodiments, an advertiser or web publisher that owns the repository uses user email or other user data to deliver further advertisements or promotional information to the user at a later date or within a predetermined time (e.g., seven days).

The terms "breaking the plane" or "breaking a plane" of the webpage mean cursor movement across the interface between a website identified by a URL being viewed by a user and the menu or submenu of functions, keys, or buttons of a web browser being used by a user to view the webpage. In some embodiments breaking the plane of the webpage means cursor movement across any predetermined horizontal line of pixels on the web browser or webpage. In some embodiments, breaking a plane means cursor movement across the interface between a website identified by a URL being viewed by a user and the menu or submenu of functions, keys, or buttons of a web browser being used by a user to view the webpage normally associated with webpage address. In some embodiments, the user's cursor gesture across the plane of the website either alone or in combination with one or a plurality of other cursor gestures indicates a willingness to leave or exit the webpage currently being viewed. In some embodiments, detection of exit behavior comprises detection of or identification of a cursor gesture breaking the plane accompanied by an acceleration of the cursor to a position on the screen associated with the exit or close of the web browser. In the case of the above illustrative embodiment, the exit or close function of the web browser is typically located (by default settings) at the top right of the screen and is indicated as an "x" button. In some embodiments, the method comprises detecting a cursor gesture of breaking the plane in combination with accelerated movement of the cursor from a position on the website to the top right of the screen or monitor being viewed by the user. In some embodiments, the method comprises identifying breaking the plane, wherein breaking the plane may be detected at any location on the screen associated with web browser functionality. In some embodiments, the method comprises identifying breaking the plane, wherein breaking the plane may be detected at any location on the screen associated with web browser exit functionality. In some embodiments, the method comprises identifying breaking the plane, wherein breaking the plane may be detected at any location on the screen associated with web browser functionality directed with altering or leaving the website being viewed by the user. One of skill in the art can readily appreciate that settings of the web browser may be changed so that the web browser functionality can be in the form of an addressable button or ribbon at the top, bottom, side or corners of the screen. The disclosure relates to any method described herein wherein detecting exit behavior of a user comprises detection of a cursor breaking the plane of website at an addressable button or ribbon at the top, bottom, side or corners of the screen and wherein detection of the cursor breaking the plane is at least partially based upon data collected by the user about those web browser settings.

In some embodiments, the disclosure relates to a method of user display segmentation. In some embodiments, the disclosure relates to a computer-implemented method of display segmentation, the method comprising: detecting a user accessing a webpage; collecting data associated with the user; and segmenting the user display into coordinates that correspond to pixilation based upon data associated with the user. In some embodiments, the method further comprising activating or deactivating detection function at a particular coordinate or set of coordinates. In some embodiments, the method further comprising detection of exit behavior. In some embodiments, the method further comprises the step of activating or deactivating detection function at a particular coordinate or set of coordinates to reduce the number of false positives associated with the detection of exit behavior.

In some embodiments, the terms "data associated with the user" mean any data about the user or the user device that can be detected by the software of the present disclosure. In some embodiments, the data about the user or user device comprise one or a plurality of the following sets of data: search criteria used by the user; login information associated with the user; browsing history associated with the user; referral history associated with the user (where the user entered the site from); an identifier associated with the user device; duration of time viewing a website; cursor position corresponding to pixel location on the screen or monitor of the user; monitor or screen resolution; positional setting of a user's web browser functionalities or tool bar; internet connection speed; settings related to the enablement of Javascript®; whether the user has minimized a window associated with the webpage; the period of time associated with inactivity on the webpage; the transition of cursor speeds from slow to fast or fast to slow; user ip address; user web browser preferences; search criteria used by the user for direction of the user to a particular URL or website viewed by the user at moment data about the user is collected; and information used by and other user device characteristics such as user device RAM, user device total memory, and/or tracking device settings. In some embodiments, tracking device settings comprise cursor sensitivity. Methods of determining cursor speed and cursor sensitivity are known in the art and are described in U.S. Pat. No. 5,191, 641 which is incorporated by reference herein in its entirety.

As used herein the term "web browser" means any software used by a user device to access the internet. In some embodiments, the web browser is selected from: Internet Explorer®, Firefox®, Safari®, Chrome®, SeaMonkey®, K-Meleon, Camino, OmniWeb®, iCab, Konqueror, Epiphany, Opera™, and WebKit®.

As used herein, the terms "an identifier associated with the user device" means any information related to identification information of the type of user device that is being used by a user to perform the method described herein or to run the software identified herein. In some embodiments, the identifier associated with the user device is selected from: a serial number of the user device, lot information of the user device, user device manufacturer, user device software applications, user device operating system, and user device owner.

In some embodiments, a measure of user action on a webpage may be utilized to detect if a user intends to leave the webpage, which may then subsequently be utilized to provide advertisements to the user. In some embodiments, the user action is in the form of cursor gestures, which represent movement of cursor on the webpage through a tracking device controlled by the user. The user action may include an action that indicates or suggests that the user intends to leave the webpage (hereinafter referred to as "exit-intent" or "exit behavior"). The cursor gestures are tracked to detect if exit-intent is exhibited by the user at the webpage. In some embodiments, a detection of one or multiple user activities that correlates with exit behavior trigger the delivery of an advertisement prior to the user exiting the webpage. The advertisement may be targeted to the user and/or based on the content the user was viewing on the webpage. This provides an opportunity for an advertiser (in some embodiments, the webpage owner) to highlight and/or solicit a conversion for a particular product or service of interest to the user at a time that the user is not occupied with viewing the webpage content.

In some embodiments, the disclosure relates to a computer-implemented method of detecting exit behavior of a user device that accesses the internet, the method comprising: detecting a user accessing a webpage; detecting exit behavior on the webpage, and providing an advertisement unit that comprises one or a plurality of solicitations aimed at conversion. In some embodiments, the method comprises a user performing a conversion activity in response to an advertisement unit displaying the conversion solicitation content.

In some embodiments, the disclosure relates to a system comprising a processor that performs a computer-implemented method of detecting exit behavior of a user of a user device that accesses the internet, the method comprising: detecting a user accessing a webpage; detecting exit behavior on the webpage. In some embodiments, the disclosure relates to a system comprising a processor that performs a computer-implemented method of detecting exit behavior of a user of a user device that accesses the internet, the method comprising: detecting a user accessing a webpage; detecting exit behavior on the webpage, and providing an advertisement unit that comprises one or a plurality of conversions. In some embodiments, the method comprises a user performing a conversion activity in response to an advertisement unit displaying the conversion. In some embodiments, the system comprises a program-product that solicits a conversion activity in response to detection of exit behavior. In some embodiments, the disclosure relates to a system including at least one processor and a computer readable memory, said computer readable memory having stored thereon program code for detecting exit intent or exit behavior comprising: means for storing data associated with a user of a user device; means for, responsive to detecting exit intent, presenting an advertisement as part of a user interface to the user. In some embodiments, the disclosure relates to a system that comprises at least one processor, a program storage, such as memory, for storing program code executable on the processor, and one or more input/output devices and/or interfaces, such as data communication and/or peripheral devices and/or interfaces. In some embodiments, the user device and computer system or systems are communicably connected by a data communication network, such as a Local Area Network (LAN), the Internet, or the like, which may also be connected to a number of other client and/or server computer systems. The user device and client and/or server computer systems may further include appropriate operating system software.

With reference to FIG. 1, a block diagram of a system 100 configured to detect exit behavior on a webpage and provide advertisements to an internet user at a user device upon detection of exit behavior is provided. The system 100 includes a web server 110. The web server 110 hosts various websites 120a-n to provide internet content to various users through one or more networks, such as the network 190. The network 190 may be any type of wired or wireless network or combination thereof, such as the Internet, a local area network (LAN), a wide area network (WAN), or the like. Users may access the content provided by the web server 110 through devices, such as the user device 150. Although one web server 110 and one user device 150 is illustrated, additional web servers and/or user devices may be incorporated in the system 100. At the user device 150, a user accesses a webpage 160 associated with one of the websites 120a-n. The user may manipulate the webpage 160 through use of one or more tracking devices 170, which may be a separate hardware component or a component integrated within the user device 150. One common example of a tracking device 170 is a mouse, but there are no limits as to the type of tracking device that may be employed herein. Other examples include, but are not limited to, a touch pad, a tracking pad, a tracking ball, and a keyboard. A user's touch (i.e., fingers) may also be considered a type of tracking device if the user device 150 includes touch functionality. With respect to the user device 150, any type of processing device to which a tracking device 170 can be attached or integrated within may be used, such as, for example and without limitation, a personal computer, a laptop, a desktop, and a handheld wired or wireless device. In some embodiments, the user device comprises one or more computer processes operated locally or remotely in one or various locations. The movement of the one or more tracking devices 170 is represented by cursor gestures, which are viewed by the user on the webpage 160.

One or more of the websites 120a-n may include an exit behavior detection module 130. The module 130 may be a software component or other computer program product that is encoded on a computer-readable storage medium, and which optionally includes or comprises instructions, (such as a programmed script or the like), that, when executed, cause operations related to the tracking and the detecting of the movement of cursor gestures on the webpage 160. The module 130 may be inserted or loaded on websites 120a-n to implement its functionality, the features of which are further described below.

The exit behavior detection module 130 functions to track cursor gestures on a webpage 160. As described above, the cursor gestures represent the movement of one or more tracking devices 170 associated with the user device 150. In this manner, the module 130 is able to detect when a user intends to leave the webpage 160. Various cursor movements and vectors may be indicative of exit-intent on a webpage 160; for example, when a user scrolls through the contents of a webpage 160 and then moves the tracking device 170 (i.e., the cursor gestures) to a portion of the webpage 160 that is associated with leaving the webpage 160. Portions of the webpage 160 associated with leaving may include, but are not limited to, an address bar, the "x" or "close" button, the "back" button, the "home" button, a browser search box, and a bookmark bar.

Other factors may also serve as an indicator of exit-intent; for example, the cursor gesture moving across the plane of the webpage 160 (hereinafter referred to as "breaking the plane" of the webpage). Breaking the plane may indicate that the user has perused content on the webpage 160 and is moving the tracking device 170 (represented by the cursor gestures) in such a manner as to leave the webpage 160. Breaking the plane may be an action of a cursor gesture movement to one of the portions of the webpage 160 associated with leaving the webpage 160.

Another indicator of exit-intent is the speed with which the cursor gesture is moved across the webpage 160. If the cursor gesture accelerates or moves above a predetermined value, this may serve as an indication that the user does not intend to leave the webpage 160 and instead has accidentally bumped or otherwise moved the tracking device 170. On the other hand, if the cursor gesture accelerates or moves across the webpage 160 at or below the predetermined value, as well as if the cursor gesture is moved from a bottom portion of the webpage 160 to a top portion, for example, this may be an indicator of exit-intent.

The module 130 may be tailored for the particular web browser being utilized by the user on the user device 150 to view the webpage 160. This tailoring may be necessary and beneficial as various web browsers may employ different means and positions for exiting webpages. For example, the toolbars may be located in different positions in various web browsers. Moreover, the content of toolbars (e.g., the buttons and corresponding functionality) may differ among various web browsers. The module 130 may include the programming script for a variety of web browsers. A detection of the web browser may be performed by the module 130, and the applicable script may then be applied when a user is viewing the webpage 160 with a corresponding web browser. Examples of web browsers include, but are not limited to, Internet Explorer®, Firefox®, Safari®, Chrome®, Opera®, WebKit®, and the various versions thereof.

The module 130 may also detect other characteristics associated with the user device 150 and settings thereof, such as the operating system, whether Javascript is enabled or disabled, the network connection speed, and the screen resolution. These characteristics may be used in the exit behavior detection. For example, screen resolution may be used to indicate the number of pixels from which the cursor gesture is moved to the top of the webpage 160, which may in turn be used to determine if the cursor gesture is moved to a position that indicates the user is intending to leave the webpage 160 by breaking the plane of the webpage 160.

Referring again to FIG. 1, a plurality of advertisers 180a-n is provided as part of the system 100. The advertisers 180a-n may communicate with the web server 110, and in particular the exit behavior detection module 130, over the network 190 to provide advertisements to be displayed on the webpage 160 in the event of exit-intent detection. Various advertising auctions that are known in the art may be employed to select the advertisers 180a-n and corresponding advertisements. As noted above, the advertisers 180a-n may wish to target specific customers and may attempt to provide an advertisement when a customer meeting the advertisement criteria is identified as the user of the webpage 160. Examples of advertisements include commercials and links to articles or websites. Advertisements may include external advertisements provided from a third party source and internal advertisements, also referred to as "house ads." An internal advertisement may be provided by the host of the webpage 160 to promote other features, products, and/or services. For example, if the user is viewing a webpage 160 of a particular television network detection of exit behavior occurs, an internal advertisement is provided to the user on the display of the user device wherein the internal advertisement includes a commercial that highlights a television show produced by the television network.

Figure 2A:
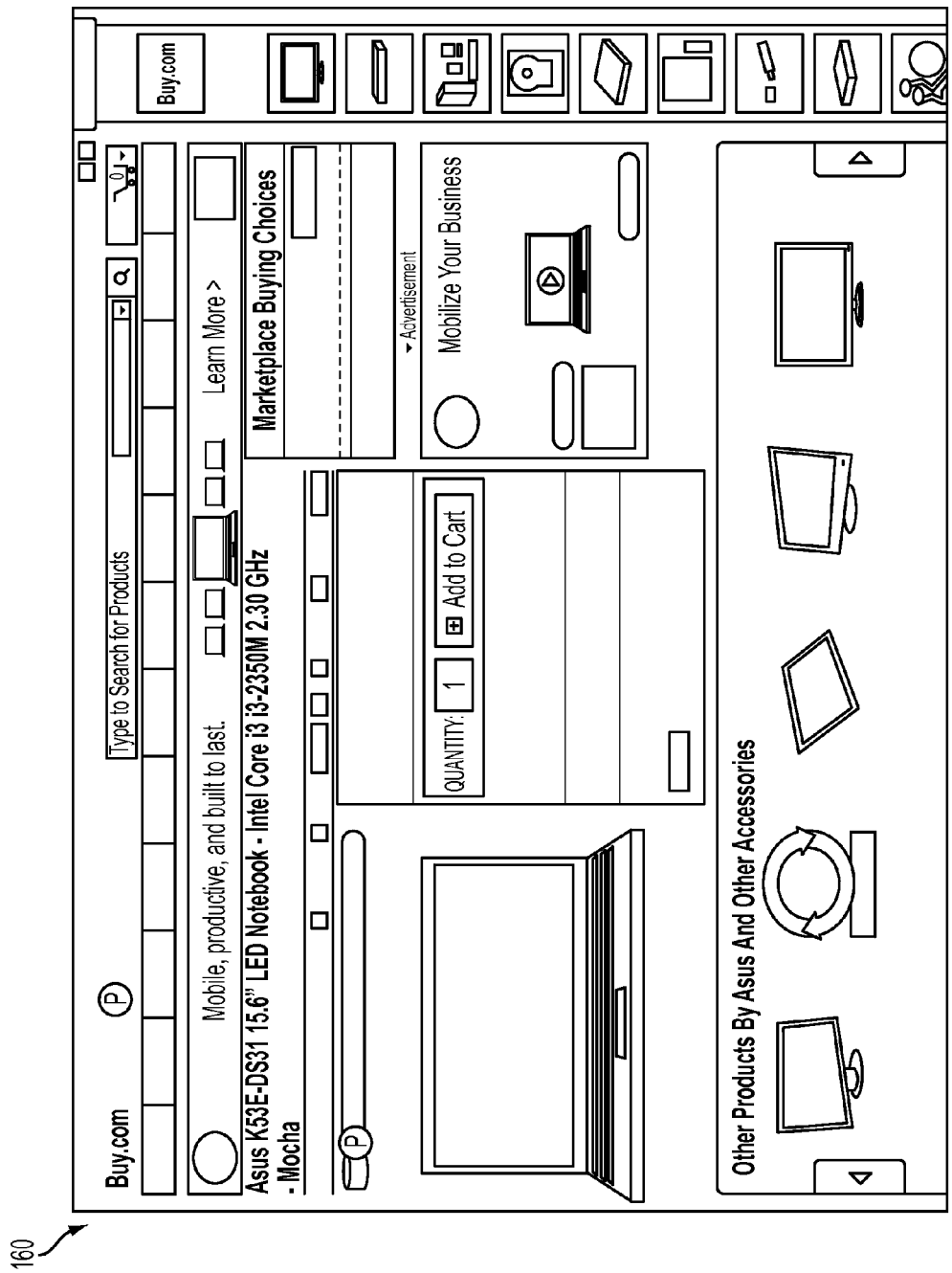
FIGS. 2A-B are a series of screen shots illustrating a webpage in which exit behavior detection is utilized.
Figure 2B:
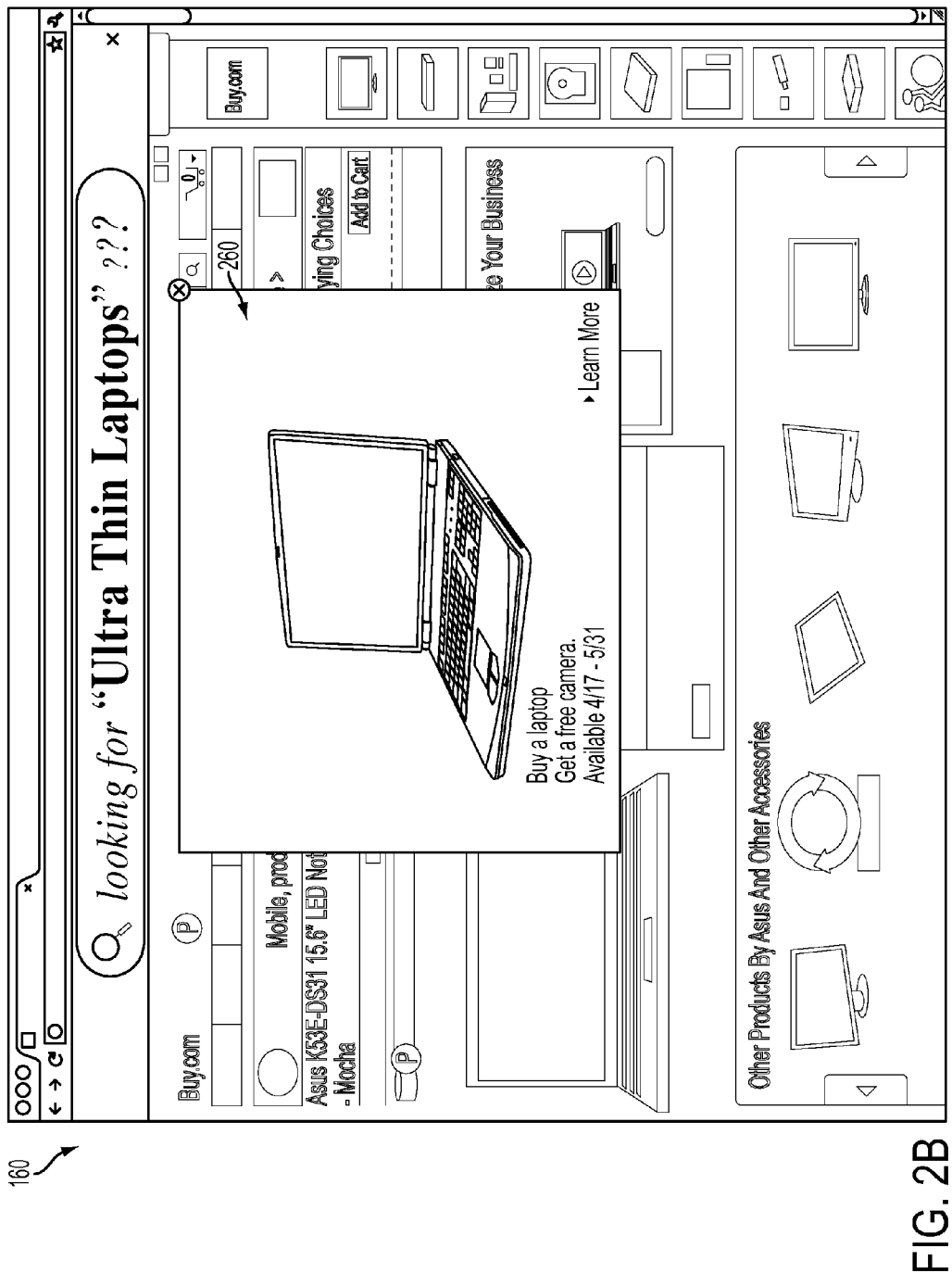

With reference to FIGS. 2a-b, a series of screenshots of a webpage 160 in which exit-intent detection is being utilized are provided.

FIG. 2a illustrates a webpage 160 that is displayed to a user of the user device 150. The webpage 160 is directed to a product for which the user performed a search (in this case, an ultra-thin laptop). However, the webpage 160 need not be the result of a product search. In fact, exit-intent detection may be applied to any type of webpage 160 regardless of its content.

Upon detecting that the tracking device 170 is being manipulated to leave the webpage 160 (as evidenced by cursor gestures), the exit behavior detection module 130 provides an advertisement unit 250 to the user via the user device 150. The advertisement 250 is shown in FIG. 2b. In the example illustrated, the advertisement 250 is populated in a window 260 that is displayed over a portion of the webpage 160. The webpage 160 may be shaded in a darker contrast than the window 260 to emphasize the advertisement 250. There are various ways in which the advertisement 250 may be presented to the user, and the display is not limited to that as shown in FIG. 2b. For example, the advertisement 250 maybe presented through a modal overlay the webpage 160 in a manner to cover a larger portion or the entire webpage 160.

Other optional features may be included to aid in and/or confirm the exit behavior detection, including a determination related to a level of engagement of the user of the webpage 160. In some embodiments, detecting exit behavior is optimized wherein the step of detecting exit behavior comprises determining the level of engagement of the user. The level of engagement relates to an amount the user is engaged with (i.e., interested in) the webpage 160. Factors related to level of engagement include, but are not limited to, an amount of time the user is actively on the webpage 160; whether the user has previously visited the webpage 160; the number of links and/or pages being viewed by the user; and a quality of a keyword search or previously visited webpage used by the user to be directed to the webpage 160; and the frequency with which the user addresses the webpage 160 with cursor movement; and the location of cursor movement relative to the amount of time the user views the webpage 160. For instance, in some embodiments, detecting exit behavior is dependent upon the scrolling action of a webpage 160 determined by movement at the side of the webpage 160. A baseline level of engagement may be established to be used as a comparison point by the module 130 to determine the level of engagement exhibited by the user. If the level of engagement meets or exceeds the baseline level of engagement, the user may be classified as engaged. A decision may be established, which is incorporated in the programmed script of the exit behavior detection module 130, not to provide advertisements or advertisement units to engaged users or to provide specific types of advertisements to engaged users. In some embodiments, the advertisement unit may be an internal advertisement unit that comprises at least one internal advertisement. An "internal advertisement" is an advertisement that communicates about information, product or service that appears on the website out of which or away from which the user of the user device wishes to exit. In some embodiments, the advertisement is external advertisement unit. An "external advertisement unit" This decision may generally be linked with the host of the website 120. For example, it may be viewed by the website host that an engaged user is not interested in receiving advertisements, or that an engaged user should be provided with internal advertisements. Baseline criteria associated with a baseline level of engagement may be, for example: five minutes as an amount of time the user is actively on the webpage 160; two visits within one week to the webpage 160; viewing five links and/or pages associated with a domain name corresponding to the webpage 160; and a keyword search of three words. If the user meets or exceeds one or more of these baseline criteria (as established by the website 120), then the user may be classified as engaged. Additional and/or alternate criteria for determining engagement of a user may also be used within the scope of this disclosure.

A time delay feature may also be incorporated in the exit behavior detection performed by the exit behavior detection module 130. The time delay may be beneficial to confirm that the user actually does intend to leave the webpage 160, thus avoiding a false positive instance in which it is detected the user is leaving, but in actuality the user is not. The time delay feature may operate by incorporating a time delay of a predetermined period of time prior to detecting exit intent to display an advertisement. After the predetermined period of time has elapsed, if a subsequent detection of exit-intent is found, this may serve as a confirmation of exit-intent. If however, an exit-intent is not exhibited following the predetermined period of time, the initial detection may be classified as a false positive, in which case an advertisement is not provided. The amount of the predetermined period of time may be established on a case by case basis per the website host. In some embodiments, the predetermined period of time is about 3, 4, 5, 6, or more seconds after the user has broken the plane of the website. In some embodiments, the predetermined period of time is about at least 3, 4, 5, 6, 7, 8, 9, 10 or more seconds after the user has broken the plane of the website. In some embodiments, the predetermined period of time is no more than about 3, 4, 5, 6, 7, 8, 9, 10 or more seconds after the user has broken the plane of the website. In some embodiments, the methods described herein include detecting an exit behavior of a user of a user device in an optimized fashion in which the decision to provide an advertisement unit depends upon one or more user actions which in sequence after breaking the plane indicate exit intent. In some embodiments, the methods described herein include detecting an exit behavior of a user with a user device in an optimized fashion in which the decision to provide an advertisement unit depends upon one or more user actions which in sequence after breaking the plane indicate exit intent. In some embodiments, the step of detecting exit behavior comprises identifying a cursor gesture associated with exiting a website and subsequently monitoring the time it takes the user to move the cursor to one or more locations on the screen. In some embodiments, the step of detecting exit behavior comprises identifying a cursor gesture associated with exiting a website and subsequently monitoring the level of activity or inactivity of the user before an advertisement unit is provided to the user. In some embodiments, the step of detecting exit behavior comprises identifying a cursor gesture associated with exiting a website and subsequently monitoring the level of activity or inactivity of the user before an advertisement is provided to the user.

An activity-inactivity feature may also be incorporated in the methods described herein and in the detection of exit behavior described herein to reduce an occurrence of false positives. The module 130 may detect inactivity by the user on the webpage 160. This may be detected through the tracking of cursor gestures. If, following a certain predefined period of inactivity, the user resumes activity on the webpage 160, the module 130 may stop monitoring the cursor gestures so that exit behavior is not detected or triggered. This functionality may also be employed if a user is using or selects multiple tabs or pages on a web browser, or if the user minimizes the webpage 160. In such instances, exit behavior detection may not be desirable as the user is perusing one or more webpages 160 without intending to leave the one or more webpages 160.

FIG. 3 is a flow chart of a method 300 of detecting exit behavior on a webpage 160 accessed by a user of a user device 150 that accesses the internet. It should be understood that each of the operations described herein can be performed directly by or in response to programming instructions executed on one or more processors, such as one or more associated with the web server 110, available to exit behavior detection module 130. These software instructions can be stored for execution via any conventional means including a hard drive, solid state memory, optical disk, flash memory, multimedia card, or via access to a remote processor, or the like.

At 310, a user is detected accessing the webpage 160. At 320, movement controlled by the user on the webpage 160 through cursor gestures on the webpage 160 is tracked. By tracking the cursor gestures, exit behavior may be identified.

At 330, a cursor gesture that represents an action of leaving the webpage 160 by the tracked movement controlled by the user is identified. As described in detail above, the actions that represent intent to leave the webpage 160 may include an acceleration of the cursor gesture at or below a predetermined value, breaking a plane of the webpage 160 with the cursor gesture, and the cursor gesture movement to a portion of the webpage 160 associated with leaving the webpage 160.

At 340, prior to identifying a cursor gesture that represents an action of leaving the webpage 160, characteristics associated with the user device 150 may be detected. This detection of user device 150 characteristics may also be done in conjunction with tracking the movement controlled by the user through cursor gestures at 320. The identified characteristics may be used to aid in identifying the cursor gesture that represents an action of leaving the webpage 160. The characteristics associated with the user device 150 may include, as described above, one or more of web browser type, operating system, enablement of Javascript (i.e., enabled or disabled), network connection speed, and screen resolution.

Figure 4:
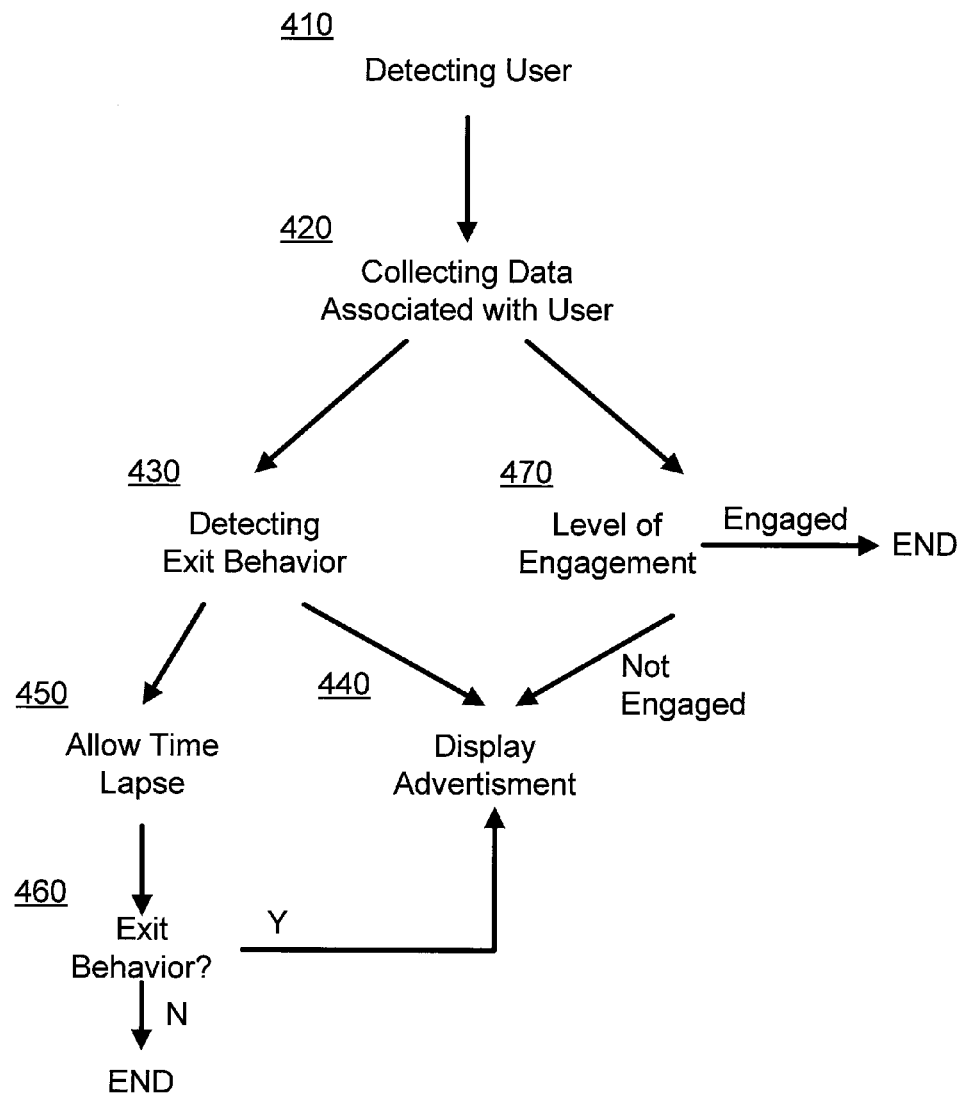
FIG. 4 is a flow chart of a method of providing an advertisement unit to an internet user at a user device based on exit behavior detection.

FIG. 4 is a flow chart of a method 400 of providing advertisements to an internet user at a user device 150 based on an exit-intent detection. It should be understood that each of the operations described herein can be performed directly by or in response to programming instructions executed on one or more processors, such as one or more associated with the web server 110, available to exit behavior detection module 130. These software instructions can be stored for execution via any conventional means including a hard drive, solid state memory, optical disk, flash memory, or the like.

At 410, a user is detected accessing the webpage 160. At 420, data associated with the user is collected. The data may be used in determining the advertiser 180*a-n* and the advertisement for the particular user. The data may also be used to aid in the exit behavior detection by providing information related to the browser, the internet connection speed, and the resolution of the monitor of the user device 150. The data associated with the user may also include, but is not limited to, user search criteria, user identification information, user preferences, and user location. The data may be used to assist an advertiser 180*a-n* in providing appropriate advertisement. For example, by having the location of a particular user as well as knowing certain user preferences (e.g., website bookmarks, online browsing history), the user may be presented with an advertisement for a service and/or product that is likely of interest to the user. The advertisement may be based on a search that the user initiated that led to the webpage 160; in this manner, the advertisement may serve as an alternative to those provided on the webpage 160. The data associated with the user may be collected by obtaining the user search criteria on the webpage, login information associated with the user, a browsing history associated with the user, and/or an identifier associated with the user device 150 (e.g., an internet protocol (IP) address).

At 430, exit behavior on the webpage 160 is detected. The exit behavior is based on tracked movement controlled by the user on the webpage 160 and includes an action indicating that the user intends to leave the webpage 160. For example, acceleration of the cursor gestures at or below a predetermined value may indicate an exit behavior, as does cursor gesture movement across the plane of the webpage 160 at or near a steady rate. An action indicating that the user intends to leave the webpage 160 may also include cursor gesture movement to an address bar on the webpage 160, to a portion of the webpage 160 associated with leaving the webpage 160. An action indicating that the user intends to leave the webpage 160 may also include a cursor gesture movement in a vector toward the "exit" or "back" button on a browser. An action indicating that the user intends to leave the webpage 160 may also include a cursor gesture movement in a vector toward the "exit" or "back" button on a browser in combination with a time delay after breaking the plane of the webpage 160.

At 440, an advertisement unit on the webpage 160 is displayed. The advertisement unit contains one or more advertisements and is based at least partially on the user data associated with the user. The advertisement unit may be a window, such as the window 260 described above with reference to FIG. 2c. Displaying of the advertisement unit may include, but is not limited to, populating a window, such as the window 260, with one or more advertisements 250, displaying the window 260 over at least a portion of the webpage 160, and shading the webpage 160 so that the window 260 is brighter in contrast than the webpage 160. Examples of content in the advertisements 250 may include a link to an advertisement webpage to view information associated with the one or more advertisements 250, a text description associated with the one or more advertisements 250, and a clickable video associated with the one or more advertisements 250. However, there is no limit on the advertisement content that may be provided. In some embodiments, an advertisement is a link to a website to view advertisement information or promotional information associated with the one or more advertisements and/or data associated with the user. In some embodiments, an advertisement comprises a link to a website to view advertisement information or promotional information associated with the one or more advertisements and/or data associated with the user. In some embodiments, an advertisement is a link to an webpage to promote the sale of a product or service associated with the one or more advertisements and/or data associated with the user. In some embodiments, an advertisement comprises a link to an webpage to promote the sale of one or more product or service associated with the one or more advertisements and/or data associated with the user. In some embodiments, an advertisement comprises a solicitation of the user's identification information such as an email address in order for the user to receive one or a plurality of advertisements or promotional information about a product associated with data associated with the user at a future time period or over a future time period. In some embodiments, the advertisement is a solicitation of the user's identification information such as an email address in order for the user to receive one or a plurality of advertisements or promotional information about a product associated with data associated with the user at a future time period or over a future time period. In some embodiments, an advertisement unit comprises at least one or a plurality of advertisements wherein the advertisements comprise a solicitation for the user to provide identification information such as a user email address. In some embodiments, an advertisement unit comprises at least one or a plurality of advertisements wherein the one or plurality of advertisements comprise a solicitation for the user to provide identification information such as a user email address. The email address in any of the aforementioned embodiments can be used by a website owner to offer the user promotional information (such as a coupon) for one or more products or services at a time in the future where such service or products related to the data associated with the user.

As described above, the feature of a time delay may be incorporated in the processing by the exit behavior detection module 130. This feature allows for avoiding certain false positives by waiting a predetermined period of time to elapse to ensure that the user intends to leave the webpage 160. At 450 of the method 400, a time delay of a predetermined period of time is allowed to elapse before detecting exit intent. Following such a time delay, at 460, a subsequent detection of exit behavior on the webpage 160 is performed. If the exit behavior is detected, the method 300 proceeds to 440 to display the advertisement unit. If there is no detected exit behavior, the method 400 ends and no advertisement unit is displayed. In some embodiments, the time delay is about 3 seconds, about 4 seconds, about 5 seconds, about 6 seconds, about 7 seconds, or about 8 seconds.

As also described above, the feature of a level of engagement may also be employed by the exit behavior detection module 130. At 470, in conjunction with detecting exit behavior by the user on the webpage 160, a level of engagement of the user on the webpage 160 is determined. If the level of engagement on the webpage 160 is high (i.e., meets or exceeds baseline criteria associated with a baseline level of engagement), as defined by the host of the website 120, the user is classified as engaged, and the advertisement unit is not displayed on the webpage 160. The method 400 then ends. If, instead, the user is not classified as engaged, the method 400 continues to 440 to display the advertisement. In some embodiments, the disclosure relates to determining the level of engagement of a user of a user device comprising determining exit intent of the user.

Figure 5:
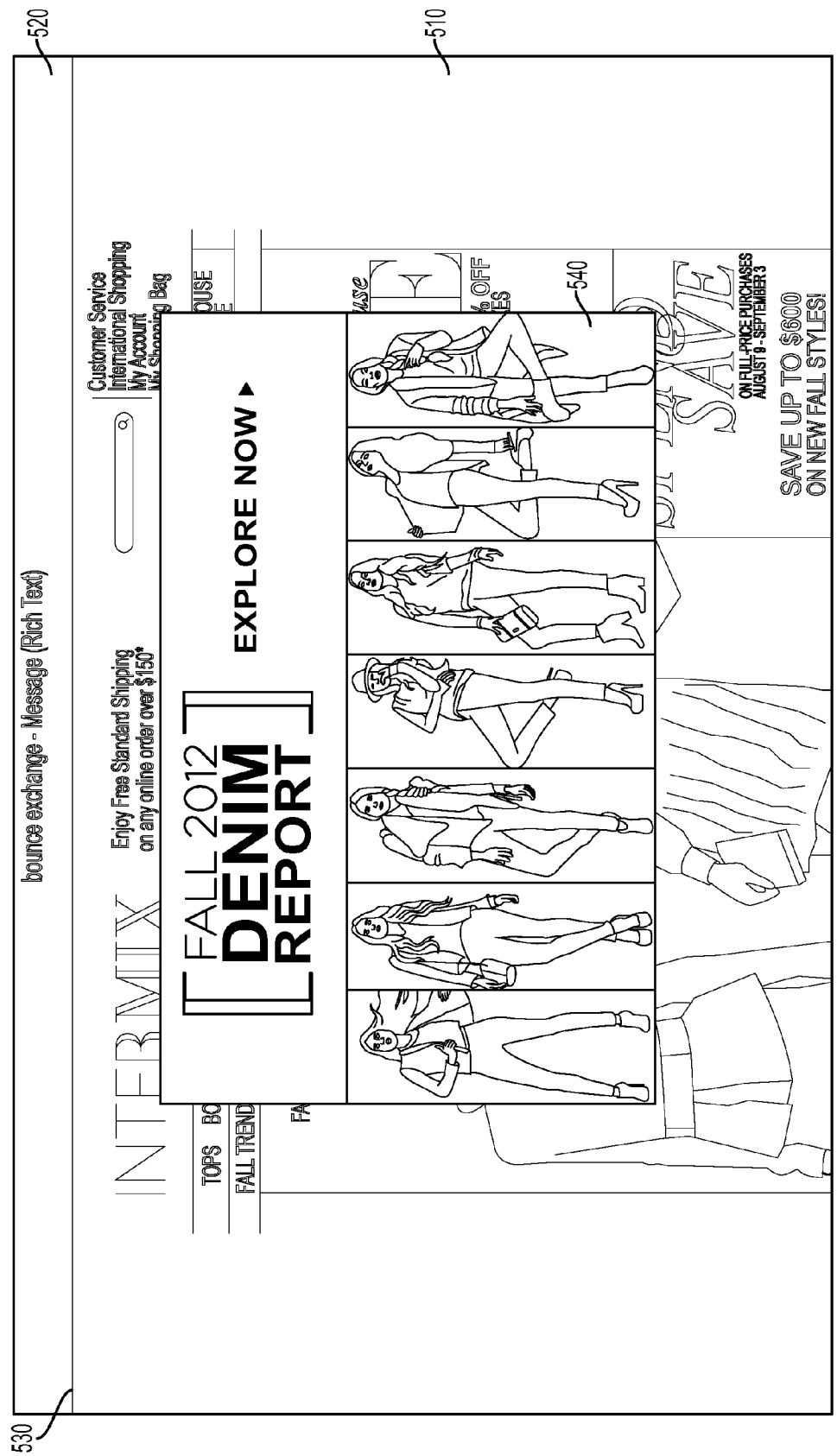
FIG. 5 is a depiction of a web page in which an advertisement is displayed to a user at a user device based upon user preferences, browser information, user device characteristics, and referral history after the user displays exit intent.

FIG. 5 depicts a webpage 510 embedded in a web browser 520. An interface between the web browser functionality and the webpage is depicted at 530. After the detection of vertical cursor movement of a user across the interface 530 in combination with detection of any one or more of the other aforementioned characteristics of the user device, web browser, etc, an advertisement 540 is displayed that, in this embodiment, related to the user preferences and user referral history. For instance, the fact that the user may have searched for and/or views a webpage related to casual clothing causes the software to trigger an advertisement related to denim clothing after the software detects exit intent of the user.

Figure 6:
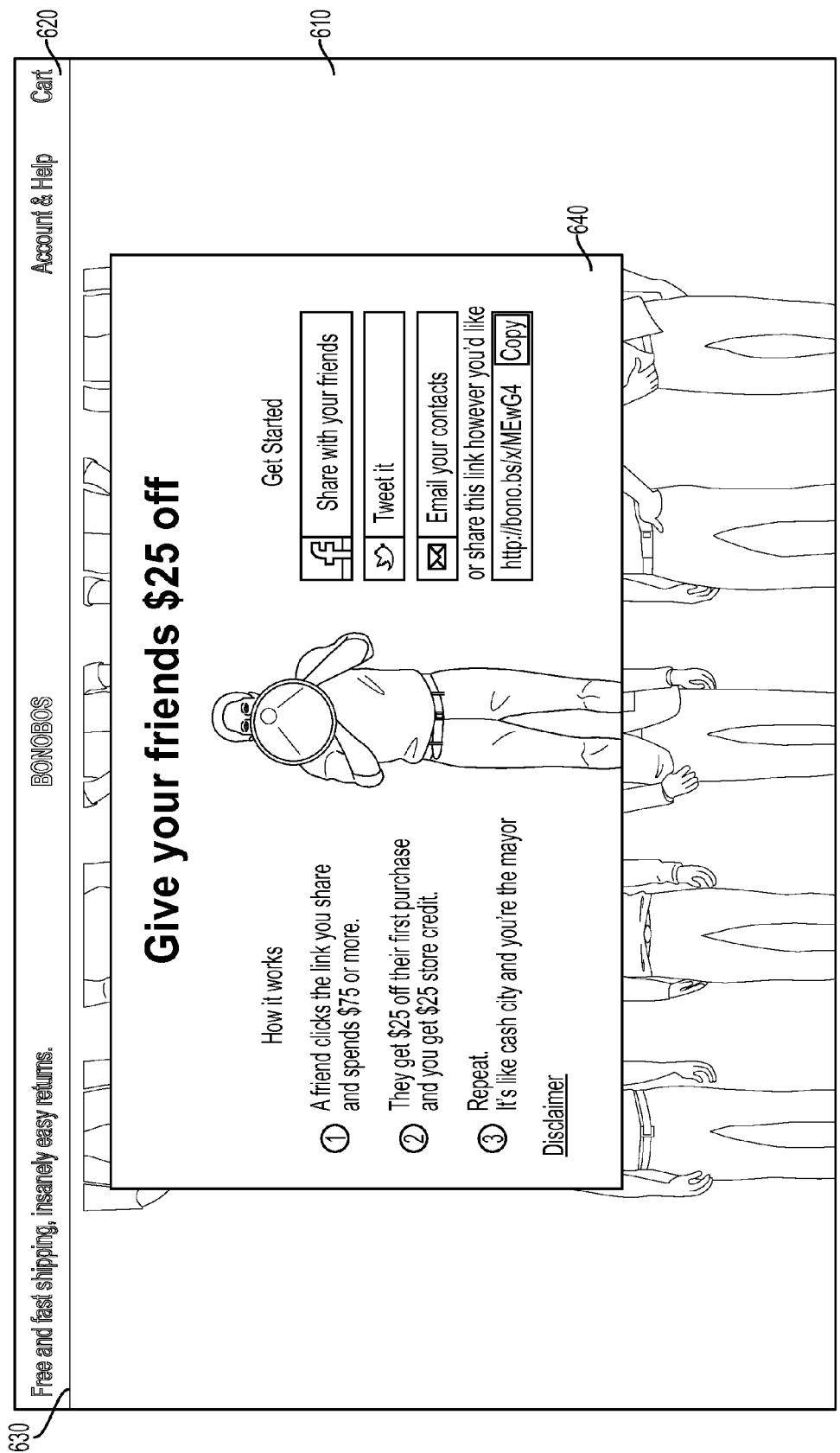
FIG. 6 is a depiction of a web page in which an advertisement is displayed to a user at a user device based upon the user preferences, browser information, user device characteristics, and referral history. The advertisement is in the form of a solicitation to user by which the user may enroll his or her email address into a database related to one or more of: (i) user search criteria; (ii) user identification information; (iii) user preferences; (iv) user location; (v) browser information; (vi) user device characteristics; (vii) user referral history; (viii) a web browser being utilized by the user device; (ix) an operating system of the user or user device; (x) whether Javascript has been enabled or disabled on the user device; (xi) a network connection speed of the user device; (xii) an enabled cookie; (xiii) screen resolution settings of the user device; and (xiv) the presence, acceleration and/or direction of mouse gestures.

FIG. 6 depicts a webpage 610 embedded in a web browser 620. Similar to FIG. 5, an interface between the web browser and the webpage is depicted at 630 is defined at the horizontal line of pixels positioned at the interface. After the detection of vertical cursor movement of a user across the interface 630 in combination with user referral history that is related to heavy use of social media centers, an advertisement 640 is displayed that invites the user to subscribe to an email listserv related to social media use.

The following description is an example of an advertisement auction; however, any type of method may be employed to obtain advertisers and advertisements to be displayed upon detecting exit behavior. When exit behavior is detected, a bid request to one or more of the advertisers 180*a-n* may be provided to begin the selection of the one or more advertisers 180*a-n* to provide the advertisement. The bid request may be sent from the exit behavior detection module 130. The exit behavior detection module 130 may select the advertisers 180*a-n* based on, for example, the user data associated with the user. One or more bids from one or more of the advertisers 180*a-n* is received, where each of the bids is associated with providing an advertisement for the advertisement unit to be displayed on the webpage 160. The one or more bids may be prioritized to determine a prioritized listing of bids. The prioritization may be based on, for example, revenue, applicability to the user, reliability of the corresponding advertiser 180*a-n*, and quality of the corresponding advertisement. The advertisement unit is then created with at least a subset of the one or more advertisements based on the prioritized listing of bids. Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution.

In some embodiments, components and/or units of the devices described herein may be able to interact through one or more communication channels or mediums or links, for example, a shared access medium, a global communication network, the Internet, the World Wide Web, a wired network, a wireless network, a combination of one or more wired networks and/or one or more wireless networks, one or more communication networks, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java™, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

Although the disclosure has been described with reference to exemplary embodiments, it is not limited thereto. Those skilled in the art will appreciate that numerous changes and modifications may be made to the preferred embodiments of the disclosure and that such changes and modifications may be made without departing from the true spirit of the disclosure. It is therefore intended that the appended claims be construed to cover all such equivalent variations as fall within the true spirit and scope of the disclosure.

What is claimed is:

1. A computer-implemented method of detecting exit behavior of a user of a user device that accesses the internet, the method comprising:
   in a system configured to host a webpage, the system comprising at least one processor and a memory,
   detecting, by the at least one processor, a user accessing the webpage;
   setting, by the at least one processor, a predetermined value, stored in the memory, that corresponds to a horizontal line on the webpage;
   detecting, by the at least one processor, the user's intent to initiate an exit command on the webpage prior to the user initiating the exit command on the webpage, wherein detecting the user's intent to initiate an exit command comprises identifying a cursor motion below, above, or across the predetermined value.

2. The method of claim 1, wherein the horizontal line is an interface between the webpage being viewed by the user and a menu or submenu of functions, keys, or buttons of a web browser being used by a user to view the webpage.

3. The method of claim 1 further comprising a step of displaying an advertisement unit on the webpage prior to the user exiting the webpage, the advertisement unit containing one or more advertisements that comprise a solicitation for a conversion.

4. The method of claim 1, further comprising:
   collecting data associated with the user or the user device, wherein the step of detecting exit behavior on the webpage is at least partially based upon the data associated with the user or the user device.

5. The method of claim 4, wherein the data associated with the user or the user device comprises one or more of: (i) a web browser being utilized by the user device; (ii) an operating system of the user or user device; (iii) whether a computer programming code has been enabled or disabled on the user device; (iv) a network connection speed of the user device; (v) an enabled cookie; (vi) screen resolution settings of the user device; and (vii) the presence of mouse gestures.

6. A computer-implemented method of providing advertisements to a user of a user device that accesses the internet, the method comprising:
   in a system configured to host a webpage, the system comprising at least one processor and a memory,
   detecting, by the at least one processor, a user accessing the webpage;
   collecting, by the at least one processor, data, stored in the memory, associated with the user;
   detecting, by the at least one processor, the user's intent to exit the webpage prior to the user initiating an exit command on the webpage; and
   displaying an advertisement unit on the webpage prior to the user initiating an exit command on the webpage, the advertisement unit containing one or more advertisements based at least partially on the data associated with the user; wherein detecting the user's intent to exit the webpage comprises tracking cursor motion controlled by the user on the webpage.

7. The method of claim 6, wherein the data associated with the user comprises one or more of: (i) user search criteria; (ii) user identification information; (iii) user preferences; (iv) user location; (v) browser information; (vi) user device characteristics; and (vii) user referral history.

8. The method of claim 7, wherein collecting data associated with the user comprises obtaining one or more of: (i) the user search criteria on the webpage; (ii) login information associated with the user; (iii) a browsing history associated with the user; and (iv) an identifier associated with the user device.

9. The method of claim 6, wherein the user's intent to exit the webpage is at least partially determined by tracking cursor movement controlled by the user on the webpage and configuration of the user's web browsing software.

10. The method of claim 6, wherein the method further comprises setting an interface value that corresponds to a pixel or set of pixels that define a position or shape on a screen being viewed by the user between a region of the webpage and a region of a web browser being used by a user to view the webpage, before detecting the user's intent to exit the webpage; and wherein the tracking cursor movement controlled by the user comprises identifying a cursor movement below, above, or across the interface value.

11. The method of claim 6, wherein the movement controlled by the user on the webpage comprises cursor gestures across a predetermined value that corresponds to a line of pixels on a screen being viewed by the user between a region of the webpage being viewed by the user and one or more regions of a web browser being used by a user to view the webpage.

12. The method of claim 6, wherein detecting the user's intent to exit the webpage comprises tracking cursor motion controlled by the user on the webpage and
   allowing a time delay of a predetermined period of time to elapse prior to displaying an advertisement unit on the webpage.

13. The method of claim 6, wherein displaying an advertisement unit on the webpage comprises:
   populating a window with the one or more advertisements;
   displaying the window over at least a portion of the webpage; and
   shading the webpage so that the window is brighter in contrast than the webpage.

14. The method of claim 6, further comprising:
   in conjunction with detecting exit intent on the webpage, determining a level of engagement of the user on the webpage; and
   if the level of engagement of the user meets or exceeds baseline criteria associated with a baseline level of engagement, classifying the user as engaged.

15. The method of claim 6, wherein each of the one or more advertisements in the advertisement unit comprises one or more of: (i) a link to an advertisement webpage to view information associated with the one or more advertisements;

(ii) a text description associated with the one or more advertisements; (iii) a clickable video associated with the one or more advertisements; and (iv) a solicitation for a conversion.

16. The computer-implemented method of claim 11, such that the cursor gestures are either: (i) cursor gestures above, below, or across an interface value between a webpage and a web browser being used by a user to view the webpage; or (ii) cursor gestures above, below, or across a predetermined coordinate or set of coordinates that correspond to a pixel or line of pixels on the webpage.

17. The computer-implemented method of claim 6, wherein the cursor gestures are cursor gestures above, below, or across any predetermined line of pixels on the webpage.

18. A non-transitory computer program product encoded on a computer-readable storage medium comprising instructions for:
    detecting a user accessing a webpage;
    collecting data associated with the user;
    detecting exit behavior on the webpage prior to the user initiating an exit command; and
    displaying an advertisement unit on the webpage prior to the user initiating an exit command on the webpage, the advertisement unit containing one or more advertisements based at least partially on the data associated with the user; wherein the exit behavior is based on tracked movement controlled by the user on the webpage.

19. The non-transitory computer program product of claim 18, wherein the data associated with the user comprises one or more of: (i) user search criteria; (ii) user identification information; (iii) user preferences; (iv) user location; (v) browser information; (vi) user device characteristics; (vii) previous visit history; and (viii) referral history.

20. The non-transitory computer program product of claim 19, wherein collecting data associated with the user comprises obtaining one or more of: (i) the user search criteria on the webpage; (ii) login information associated with the user; (iii) a browsing history associated with the user; and (iv) an identifier associated with the user device.

21. The non-transitory computer program product of claim 18, wherein the movement controlled by the user comprises acceleration of the cursor gestures at or below a predetermined value.

22. The non-transitory computer program product of claim 18, wherein the tracked movement controlled by the user on the webpage comprises a cursor movement below, above or across a pixel or set of pixels corresponding to a position or shape on the screen of the user between a region of the webpage and one or more regions of the web browser functionality being used by a user to view the webpage.

23. The non-transitory computer program product of claim 22, wherein the action indicating that the user intends to leave the webpage comprises cursor movement across a predetermined value that corresponds to a line of pixels between a region of the webpage being viewed by the user and a menu or submenu of functions, keys, or buttons of a web browser being used by a user to view the webpage.

24. The non-transitory computer program product of claim 18, wherein the instruction for detecting exit behavior on the webpage prior to the user initiating an exit command is based on tracked movement controlled by the user on the webpage and
    allowing a time delay of a predetermined period of time to elapse prior to displaying an advertisement unit on the webpage.

25. The non-transitory computer program product of claim 18, wherein instructions for displaying an advertisement unit on the webpage comprise instructions for:
    populating a window with the one or more advertisements;
    displaying the window over at least a portion of the webpage; and
    shading the webpage so that the window is brighter in contrast than the webpage.

26. The non-transitory computer program product of claim 18, further comprising instructions for:
    in conjunction with detecting exit behavior on the webpage, determining a level of engagement of the user on the webpage; and
    if the level of engagement of the user meets or exceeds baseline criteria associated with a baseline level of engagement, classifying the user as engaged.

27. The non-transitory computer program product of claim 18, wherein each of the one or more advertisements in the advertisement unit comprises one or more of: (i) a link to an advertisement webpage to view information associated with the one or more advertisements; (ii) a text description associated with the one or more advertisements; and (iii) a clickable video associated with the one or more advertisements.

28. A system comprising a computer storage device that comprises the non-transitory computer program product of claim 18.

* * * * *